United States Patent
Hourlier et al.

(10) Patent No.: US 10,847,115 B2
(45) Date of Patent: Nov. 24, 2020

(54) BINOCULAR RIVALRY MANAGEMENT

(71) Applicant: THALES, Courbevoie (FR)

(72) Inventors: Sylvain Hourlier, Merignac (FR); Bruno Aymeric, Merignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/150,231

(22) Filed: Oct. 2, 2018

(65) Prior Publication Data

US 2019/0108813 A1    Apr. 11, 2019

(30) Foreign Application Priority Data

Oct. 5, 2017    (FR) ..................... 17 01031

(51) Int. Cl.
| | |
|---|---|
| *G09G 5/10* | (2006.01) |
| *G09G 5/00* | (2006.01) |
| *G09G 5/37* | (2006.01) |
| *G02B 27/01* | (2006.01) |

(52) U.S. Cl.
CPC ............. *G09G 5/003* (2013.01); *G02B 27/01* (2013.01); *G02B 27/0101* (2013.01); *G02B 27/017* (2013.01); *G02B 27/0172* (2013.01); *G09G 5/10* (2013.01); *G09G 5/37* (2013.01); *G02B 2027/014* (2013.01); *G02B 2027/0132* (2013.01); *G02B 2027/0141* (2013.01); *G02B 2027/0187* (2013.01); *G09G 2320/0626* (2013.01); *G09G 2340/14* (2013.01); *G09G 2354/00* (2013.01); *G09G 2360/144* (2013.01); *G09G 2380/12* (2013.01)

(58) Field of Classification Search
CPC ............... G09G 5/003; G09G 2340/14; G09G 2320/0209; G02B 27/017; G02B 27/0172; G02B 2027/0132; G02B 2027/0141; H04N 2213/002
See application file for complete search history.

(56) References Cited

U.S. PATENT DOCUMENTS

| | | | |
|---|---|---|---|
| 5,233,458 A | 8/1993 | Moffitt et al. | |
| 9,618,749 B2* | 4/2017 | Deleeuw | ............ H04N 13/398 |
| 10,332,315 B2* | 6/2019 | Samec | ................ G02B 27/017 |
| 2016/0077345 A1 | 3/2016 | Bohan et al. | |
| 2016/0139432 A1 | 5/2016 | Moore | |

FOREIGN PATENT DOCUMENTS

WO    2016/107921 A1    7/2016

OTHER PUBLICATIONS

Patterson, et al., "Binocular rivalry and head-worn displays", Hum Factors, vol. 49, No. 6, pp. 1083-1096, Dec. 1, 2007.

* cited by examiner

*Primary Examiner* — Antonio A Caschera
(74) *Attorney, Agent, or Firm* — BakerHostetler

(57) ABSTRACT

The invention relates to the management of binocular rivalry, and by extension of attentional rivalry, in a display system. A method of the invention may include determining visual surroundings parameters; determining a risk of visual suppression by binocular rivalry between an element of the visual surroundings and an element displayed by the display device on the basis of the visual surroundings parameters; and, on the basis of the determined risk, adjusting the display.

15 Claims, 4 Drawing Sheets

BINOCULAR RIVALRY MANAGEMENT

CROSS-REFERENCE TO RELATED APPLICATIONS

This application claims priority to foreign French patent application No. FR 1701031, filed on Oct. 5, 2017, the disclosure of which is incorporated by reference in its entirety.

FIELD OF THE INVENTION

The invention relates to the technical field of display methods and systems in general, and to methods or systems for managing binocular rivalry in particular.

BACKGROUND

A head-up display (HUD) allows the pilot of a vehicle to monitor his surroundings at the same time as information supplied by his on-board instruments. This type of device superimposes particular information (e.g. piloting, navigation, mission) in the pilot's field of vision. Various devices are known in the prior art, notably the use of projectors, of semi-transparent mirrors, of transparent projection surfaces (e.g. augmented reality) or opaque projection surfaces (e.g. virtual reality), or even projection surfaces whose opacity is able to be configured.

Binocular fusion is a visual perception phenomenon that allows the human visual system to produce a single image from two images, one originating from each eye. This fusion, when it is imperfect, may produce diplopia (double vision) or binocular rivalry (either an alternation between the rival images over time or the perception of a composite image that is however not fused and that may fluctuate).

Binocular rivalry is a phenomenon that is known and documented in the literature.

Binocular rivalry is a visual phenomenon during which awareness alternates between very different images that are presented to each eye. When the images are very similar, they fuse together so as to form a single binocular image. If the differences exceed a tolerable threshold, they are superimposed for a few moments, and then one of them is perceived, followed by the other one, in a cycle of right-hand image—left-hand image alternations, called transitions. The transitions between the images are not instant but are marked by an unstable composite image, during which a wavefront travels through the image, transforming the right-hand image into the left-hand image (or vice versa).

When the visual information presented to each eye is different, certain elements present in one or the other of the images may 'disappear'. These disappearances are marked in the foveal zone (field centred about the line of vision) and generally occur when information is present at the same location in the two images and comes into competition for the attention that it requires in order to be 'observed'. Some systems utilize these suppressions to supply instrument information to specific locations of the field of vision, for example at the periphery and in a format that does not come into competition with the external landscape.

Some display devices, for example HUDs, may be binocular (i.e. call on both eyes), and others are monocular (i.e. a single eye). In such monocular head-up systems, information is overlaid on the surroundings.

Some applications for managing the display of monocular systems have a sight in the form of a crosshair (e.g. a cross or a point at the centre of the field of vision). In order to suppress binocular rivalry, the pilot then has to close one eye so as to call on just one of his two eyes. In some cases, it is not necessary to close one eye (the crosshair may be perceived with both eyes open when certain spatial direction conditions are met, with a minimized risk of suppression). However, generally speaking, this visual gymnastics on the part of the pilot is constrictive, tiring and above all is not optimal. Moreover, the use of such systems is reserved for trained personnel.

In aeronautics, certain types of information may create frequent suppressions. This is the case of the symbol called flight path vector (FPV). The FPV shows the direction in which an aeroplane is moving. When approaching a runway, the FPV will be in the same direction as the runway. The binocular rivalry problem will come fully to the fore since the pilot will have to focus his attention on two elements sharing the same position in the field of vision but seen differently by the two eyes.

Beyond even the binocular rivalry problem (i.e. physiological), an attentional rivalry problem may arise. Specifically, it is possible for the attention of the pilot using an HUD to be engaged entirely by the symbology displayed in his line of vision, and for him then to underestimate the appearance of obstacles in the external surroundings in this same line. Military pilots are generally trained to focus their attention alternately on the symbology and then on the background external surroundings.

Scientific literature and patent literature describe few satisfactory solutions for this management of the cognitive loss produced by binocular rivalry, in particular in the case of a monocular display system. Attentional rivalry a fortiori is addressed to an even smaller extent.

There is a need for systems and methods for managing the display of monocular HUD type.

SUMMARY OF THE INVENTION

The invention relates to the management of binocular rivalry, and by extension of attentional rivalry, in a data display system. The method comprises the steps of determining visual surroundings parameters; determining a risk of visual suppression by binocular rivalry between an element of the visual surroundings and an element displayed by the display device on the basis of the visual surroundings parameters; and, on the basis of the determined risk, adjusting the display. Developments of the invention describe the management of the luminance, of the chrominance and of the geometry of the displayed elements. Optimizations in the field of avionics are described. Software and system aspects are described (e.g. brightness sensors and/or gaze-tracking sensors, monocular or binocular system).

According to the embodiments of the invention, an aircraft may be a commercial, military or cargo aeroplane, an autonomous or remotely piloted drone, a helicopter, or any other transport means able to use a head-up display. The invention is not limited to aeronautical applications since it is able to be applied to other types of vehicle (e.g. car, lorry, bus, train, boat, etc.).

Advantageously, a commercial aircraft may have an on-board display system according to the invention, which does not require specific training for an airline pilot.

In one embodiment, the method determines the likelihood or a risk of suppression of visual information. Where applicable, for example when a predefined threshold is exceeded, the presentation of information may be technically adapted so as to increase or maximize visual perception. The use of symbols may be tailored to particular conditions encountered during the flight of the aircraft, so as to have maximum or optimum piloting efficiency.

In one embodiment, one adjustment variable comprises adjusting the brightness of the information overlaid or superimposed in the pilot's field of vision. This adjustment of the brightness may be carried out in accordance with one or more predefined models. Said models may for example make it possible to attract or to hold the pilot's cognitive visual attention. In one embodiment, the additional visual requirements may be fulfilled without otherwise diverting the pilot's general attention that is paid to his surroundings. In one embodiment, the brightness may be adjusted at particular time intervals and/or on the basis of a risk of visual suppression. For example, the pilot's visual system may be called on so as to regularly reacquire or reactivate the symbology specifically implemented when said symbology is likely to be the subject of cognitive loss.

The invention not only makes it possible to manipulate or to bring about minimum attention: it also makes it possible to manage a maximum visual demand. For example, in one embodiment, the pilot's gaze is tracked. The pilot is able to focus his attention on other information that is displayed and/or other directions in space in his field of vision. The display of the symbols may be optimized so as to minimize the distraction that is caused.

BRIEF DESCRIPTION OF THE DRAWINGS

Various aspects and advantages of the invention will appear in support of the description of one preferred, but non-limiting, mode of implementation of the invention, with reference to the figures below.

DETAILED DESCRIPTION

Figure 1:
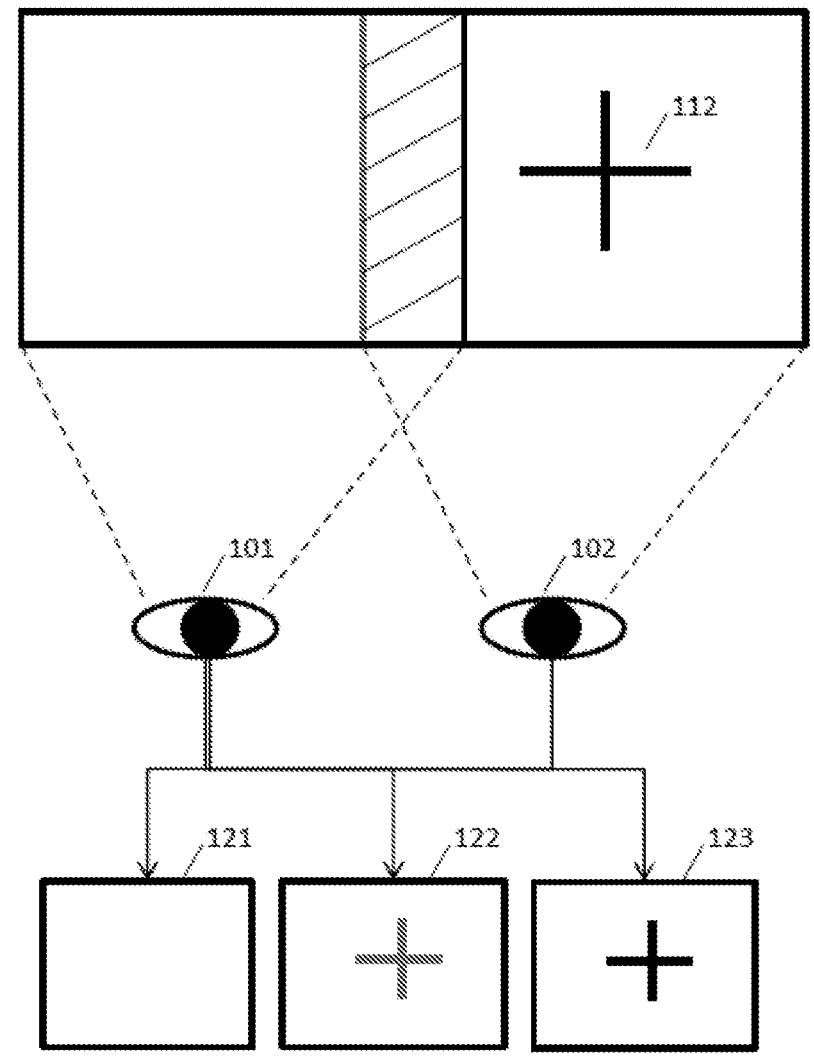
FIG. 1 illustrates an example of binocular rivalry.

FIG. 1 illustrates an example of binocular rivalry. The two eyes of the pilot, 101 and 102, each perceive an image. The two images are normally fused. In the case of a monocular display system, a crosshair 112 may be displayed. As the two images that are perceived are different, the binocular rivalry phenomenon may occur: the brain may perceive an image without a crosshair 121, an image with a crosshair 123 or else a composite or intermediate image (e.g. that is unstable, oscillating, etc.) 122.

Binocular rivalry is a manifestation relating to the physical perception made by the visual system (i.e. the management of visual stimuli). The appearance of a rivalry may be conscious. It may also (often) be subconscious. Emergent or existing binocular rivalry is not able to be measured directly by an external system: there is no measurable physiological manifestation associated with a cognitive loss. In spite of all this, the presence of (emergent or existing) binocular rivalry may be suspected indirectly (for example when the pilot's commands differ significantly, e.g. contradict piloting instructions). Such differences are able to be detected very quickly in time (e.g. through comparison between measurements made on the actuators available to the pilot, e.g. control stick and the piloting instructions; manipulation of the steering wheel for the purpose of passing a vehicle while the road signage and the display elements prescribe different behaviour).

The embodiments of the invention therefore aim to optimize the management of the binocular rivalry of a display system. In reality, the embodiments of the invention may also deal with what is called 'attentional' rivalry.

This what is known as attentional rivalry is 'internal', i.e. exclusively cognitive. The human brain, although it is perceiving the visual signals correctly (at the limit without the appearance of binocular rivalry), may 'hide' information elements. For example, a car driver who is concentrating completely on a passing manoeuvre may neglect a speed limit warning light, even though his visual system has decoded it perfectly and fused the visual stimuli. A pilot concentrating on an object present on the horizon may neglect objects present in the first plane, which are possibly hazardous.

This attentional rivalry, which is exclusive and specific to each brain, is not able to be measured or inferred (black box'). By contrast, reminders (and variations thereof, so as to avoid accustomization) may expediently be implemented, so as to make it possible in fine to hold the user's attention (placed in a risky situation or a scenario-based decision situation, justifying keeping a state of alertness or particular awareness).

Figure 2:
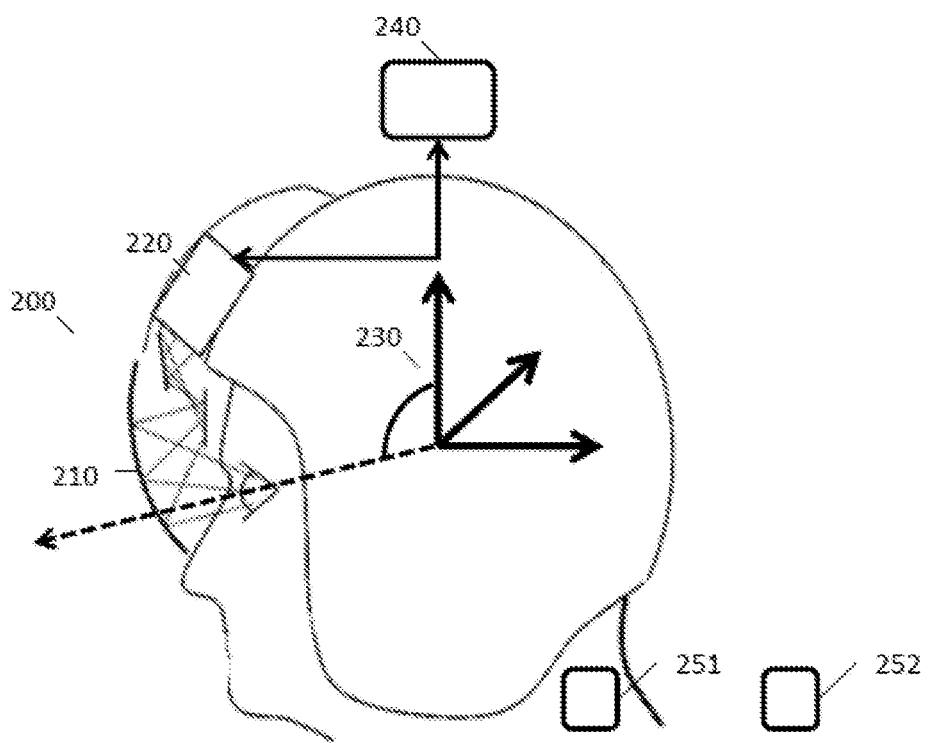
FIG. 2 illustrates an example of a head-up display system.

FIG. 2 illustrates a head-up display or HUD system 200. This type of display system presents information (for example piloting information) superimposed on the external landscape (visible transparently or as captured and retransmitted in video).

The display system 200 may comprise a transparent display 210 onto or on which an image is able to be projected or created, making it possible to see this image superimposed on an 'external' scene. A monocular system includes a single display. A binocular system includes two displays. In some variant embodiments, the transparency of a display is variable (or able to be configured).

A display is fixed or associated with the pilot's head, such that the display is kept close to the eye ('near-to-eye display'). In the example that is illustrated, the display is fixed to a headset worn by the pilot. Other means are possible (e.g. glasses that are worn, fixed carrier that the operator approaches, etc.). In some embodiments, an HUD display may be a device fixed to the aeroplane, offering a fixed field of view (generally having a 40° lateral −26° vertical field of view). In other embodiments, the head-up display is fixed to a headset or a viewing apparatus worn by the pilot.

The display system 200 furthermore includes a subsystem 230 for detecting the direction towards/in which the head i.e. of the operator is directed. In one variant, a gaze-tracking system is used ('eye-tracking'). Numerous systems allow this type of measurement (optical, electrical, mechanical measurement, etc.).

The display system 200 comprises or is associated with a computer, i.e. computational resources 240 (e.g. computing, storage, graphics, etc.). The computer 240 pilots (commands, controls) the projector 220. The computer utilizes the information relating to the tracking 230 of the direction of the head and/or of the gaze. It integrates and manipulates various information relating to the aircraft and/or the mission. It determines, at each instant (continuously, according to the desired video refresh rate), the operational image to be displayed on the display.

The display system 200 may be associated with one or more human-machine interfaces (HMI), e.g. entry peripherals (mouse, keyboard, touchscreen, touch force, haptic means, trackpad, trackball, etc.), allowing the pilot to make selections from among multiple data that are proposed, or else to enter data. According to the embodiments, the HMI may comprise various peripherals or combinations of peripherals. In some cases, voice commands may be used. In other cases, neural interfaces may be used. Interfaces for selection by eye blinking may be used.

In one embodiment, the brightness conditions and/or the rules governing brightness management are predefined (for example by the airline).

In one embodiment, the brightness conditions and/or the rules governing brightness management are able to be configured by the pilot.

In some variant embodiments, various sensors may optionally be used. For example, biological sensors 251 may be used (e.g. heart rate sensor, EEG, sensor placed on the skin estimating the pilot's perspiration level), so as to quantify or estimate the pilot's stress level. Surroundings or environment sensors 252 may be used (e.g. brightness, temperature, relative humidity, etc. sensors).

In one embodiment, the brightness may be captured in an overall manner (overall illumination in the visor or in the cockpit, average illumination of the external surroundings). In some embodiments, the brightness may be captured in a differentiated manner: some directions in space may be illuminated differently (depending on the position of the sun, the atmospheric conditions and the local light reflection conditions, the illumination may not be uniform).

In one embodiment, the management of the display may be controlled by the detected brightness conditions. Specifically, the computer may tailor the brightness of the display on the basis of the brightness (ambient or in the direction in space).

In terms of quantity, numerous information may be displayed in or via the display 200. In terms of quality, information of various types is able to be manipulated.

From among all of the possible ones, one specific item of information takes on particular importance in terms of piloting and causes technical problems with cognitive loss due to the circumstances in which it is displayed: the flight path vector (FPV). As the FPV is seen by just a single eye, it is liable to disappear in the perception of the operator due to rivalry. The invention is therefore particularly well suited to managing the display of this information.

The flight path vector represents the direction in which the aircraft is moving. The flight path vector is generally displayed in the form of a graphical symbol. The information relating to the amount of fuel and speed deviation are generally displayed next to or close to this symbol. This set of information allows the pilot, while at the same time looking outwards, to ensure that his aircraft is in correct flight conditions.

Figure 3:
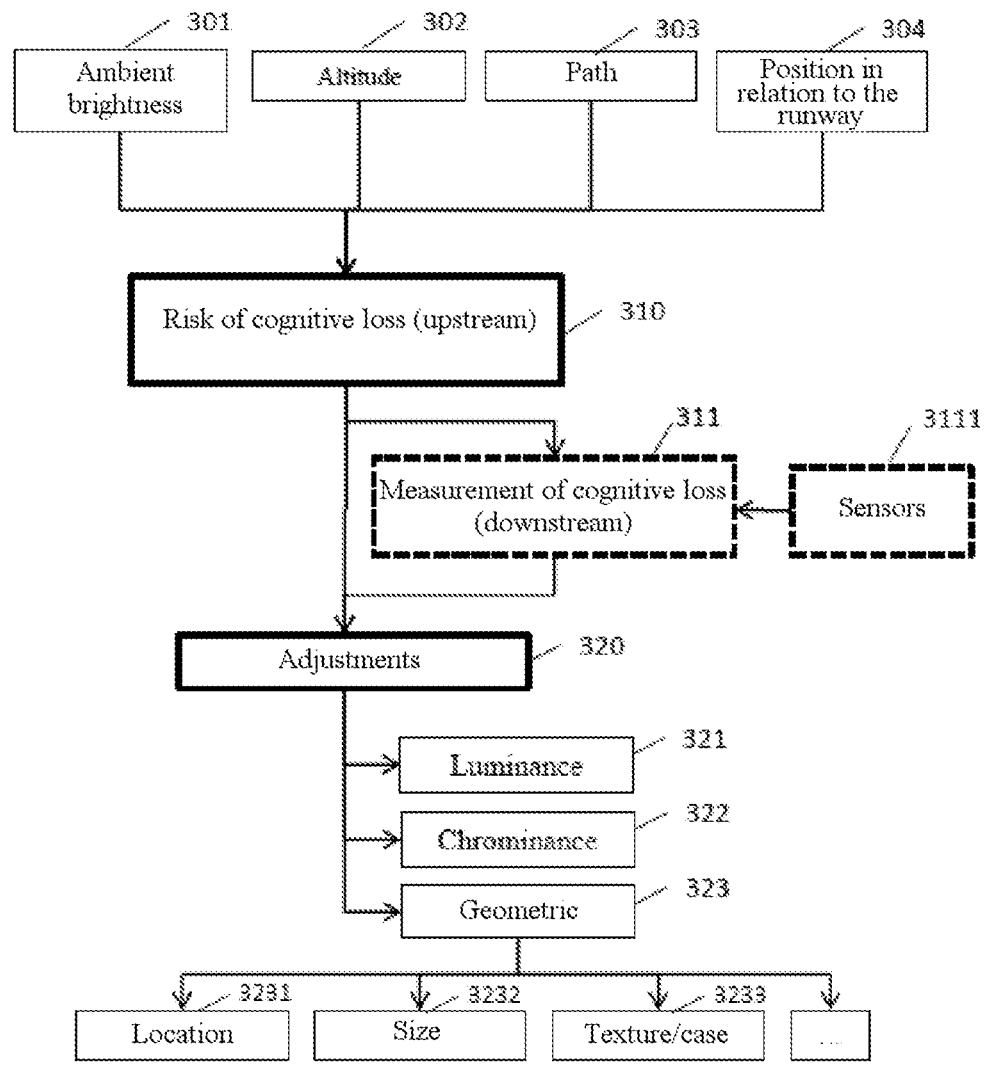
FIG. 3 shows examples of steps of the method according to the invention.

FIG. 3 shows examples of steps of the method according to the invention.

In one embodiment, the method according to the invention is a data display management method, implemented in a monocular or binocular display device, comprising the steps of:—determining one or more visual surroundings parameters associated with the display device; determining a risk of visual suppression by binocular rivalry between an element of the visual surroundings and an element displayed by the display device on the basis of said visual surroundings parameters;—on the basis of the determined risk, adjusting one or more display parameters of the head-up display device. The term 'display device' manipulated by the invention denotes any display system interspersed or inserted between the visual system (i.e. the eyes) of a user (e.g. surgeon, pilot, computer scientist, etc.) and his external surroundings (which therefore form a 'visual background').

It may therefore be a monocular HUD system (Google Glass connected glasses), but also a binocular system (e.g. an HMD system that delivers two different images, one for each eye). What are known as 'bi-ocular' display systems present the same images to both eyes and therefore do not have a reason to create binocular rivalry the management of which is intended to be optimized by the invention. A windscreen onto which driving information is projected provides different images to the right-hand eye and to the left-hand eye and therefore falls into the category of binocular display systems.

In one embodiment, one visual surroundings parameter comprises one or more parameters from among the ambient brightness level and/or the brightness level measured through the display device. As a first approximation, measuring the, for example omnidirectional, ambient brightness level allows effective downstream management of binocular rivalry. In more sophisticated embodiments (that remain optional), it may be advantageous to measure the luminance directionally. For example, the brightness may be measured in the axis of the runway, in an aeronautical application of the invention. In the case of a connected contact lens, it is possible to have photoreceptors positioned on the surface and/or in the body of the lens, so as to determine the brightnesses in the different directions in space.

In one embodiment, one surroundings parameter comprises one or more parameters comprising the altitude of an aircraft in which the display device may be situated, the path of said aircraft and its position in relation to a runway. In one specific (aeronautical) embodiment, the abovementioned parameters may be overriding.

In one embodiment, one surroundings parameter furthermore comprises parameters associated with the activity of the user using the display system. A plurality of activities may be predefined. At any time, it may be determined (e.g. declared and/or calculated) what activity is being performed by the user (e.g. inactivity, resting, active piloting, reading, writing, etc.). In some embodiments, knowing the activity being performed (at a given instant) by the user may make it possible to optimize the adjustment of the display. The activities may be varied, but a principle or common factor is that each activity of the user may exhibit one or more risks (of various types depending on the activity, e.g. making a logic decision, a selection on an automation screen, piloting an aeroplane, driving a car, physical hazard with respect to a machine tool, etc.). In other words, qualitative attributes of the activity under consideration may be quantified (e.g. modelled or calculated or deduced or inferred), that is to say divided into categories, each one being associated with a risk or a likelihood, these risks or likelihoods being associated with one another (e.g. scenarios). For example, if the activity relates to the use of a circular saw on a machine tool, the position with increased or decreased protection may be monitored (by the machine and/or the human). The risk is in this case located in space. The display system may display a symbol relating to this safety state, via the (monocular or binocular) display device. The gaze of the operator may be directed towards numerous locations. Visual loss may then be managed in such a way as to optimize (i) the (physical) perception of the safety indicator, i.e. in order to avoid any binocular rivalry and, if possible, (ii) the cognitive perception of the hazard (i.e. attempt to maintain attentional rivalry).

In one embodiment, one display parameter of the display device comprises one or more parameters comprising the luminance and/or the chrominance of one or of a plurality of elements displayed by the display device. Luminance is the overriding factor that is decisive for managing binocular rivalry. Additionally and optionally, managing the chrominance makes it possible to further improve this management. In some embodiments, the luminance is not modified, and only the chrominance is manipulated.

In one embodiment, one display parameter furthermore comprises the geometry of the displayed element, said geometry comprising location and/or display dimension parameters.

In addition (and optionally) to managing the luminance and/or the chrominance, managing the geometry of the displayed elements makes it possible to further improve the management of binocular rivalry.

Various embodiments are possible; binocular rivalry may be likely, starting, effective, currently disappearing or finished. Binocular rivalry may set in before having awareness of this: binocular rivalry is able to be combated by training or factually by reminders via the display, whether these reminders are or are not associated with actual measurements.

In one embodiment, binocular rivalry may be anticipated a priori. The visual background and/or the activity of the user may lead to an estimation that binocular rivalry is likely. By anticipation, in a proactive manner, the countermeasures according to the invention may be implemented.

In one embodiment, the method furthermore comprises the step of indirectly determining the emergence or the presence of visual suppression by comparison between commands emitted by the user of the display system and instructions that are displayed. Binocular rivalry may be detected as soon as it emerges, at least indirectly. If there is no means for detecting binocular rivalry using direct physiological measurements, the emergence of binocular rivalry, at the subconscious stage, is able to be determined indirectly. For example, piloting decisions that are not corroborated by or consistent with instructions that are displayed may cause suspicion that visual suppression has taken place (and, if applicable, trigger measures for managing the rivalry according to the invention as a counter-reaction). For example, if one runway out of two is recommended and the pilot pushes the control stick in the direction that is not recommended, visual suppression may be suspected.

In one embodiment, the method furthermore comprises the step of determining the emergence or the presence of visual suppression by activation of an actuator. Once aware (i.e. the user has become aware of the visual problem), the activation of the countermeasures may be triggered upon demand. The monitoring mode may also be activated or deactivated beforehand by the user (upstream choice to monitor the rivalry on/off, then provision downstream via an actuator or a command, e.g. touchscreen or voice command, in order to manage the rivalry afflicting the user).

In one embodiment, the method furthermore comprises the step of warning of the emergence of visual suppression by the repeated display, variable over time and/or in space, of visual reminder elements. The frequency (e.g. the rate) and/or the form of the reminders may be able to be configured so as to keep a level of attention appropriate for the circumstances.

In one embodiment, the step of adjusting one or more display parameters of the display device is governed by one or more display rules that are predefined and/or able to be configured by the user wearing the display device.

In one embodiment, the luminance is modified over time according to profiles comprising one or more sequences comprising a sequence of gradual increasing luminance, a sequence of a substantially constant plateau, a sequence of sudden increasing luminance, a sequence of gradual decreasing luminance.

In one embodiment, a display rule depends on the flight context of the aircraft. In one development, the step of determining the flight context comprises one or more steps from among the steps of determining information associated with the state of the systems of the aircraft and/or determining information associated with the surroundings of the aircraft and/or applying predefined logic rules to said determined information. In one development, the step of determining the flight context comprises the step of receiving or detecting one or more events chosen from among a sequence of flight plan points, a change of active leg, a revision of the flight plan, the introduction of a hold command or the reception of clearance from air traffic control. In one development, the flight context is declared by the pilot. In one development, the flight context is determined repeatedly over time.

In one embodiment, one element that is displayed is the flight path vector FPV of an aircraft.

A computer program product is disclosed, said computer program comprising code instructions for carrying out one or more of the steps of the method when said program is executed on a computer.

A data display system is disclosed, said system comprising a monocular or binocular display device, said system being configured to—determine one or more visual surroundings parameters associated with the head-up display device;—determine a risk of visual suppression by binocular rivalry between an element of the visual surroundings and an element displayed by the display device on the basis of said visual surroundings parameters; on the basis of the determined risk, adjust one or more display parameters of the display device.

In one embodiment, the system comprises one or more brightness sensors measuring the ambient brightness and/or the brightness in one or more directions in space of the visual surroundings and/or through the display device.

In one embodiment, the display system comprises one or more gaze-tracking devices.

In one embodiment, the data display management method is implemented in a system implemented in the cockpit of an aircraft, this system comprising a head-up display device.

In one embodiment, the method comprises the steps of:—determining one or more visual surroundings parameters (for example 301, 302, 303, 304) associated with the head-up display device;

determining a risk of visual suppression 310 by binocular rivalry between an element of the visual surroundings and an element displayed by the head-up display device on the basis of the visual surroundings parameters;

on the basis of the determined risk, adjusting 320 one or more display parameters of the head-up display device.

In one embodiment, the method comprises a step of calculating a visual suppression (i.e. cognitive loss) risk condition. To this end, according to the embodiments, one or more types of information (i.e. data) may be used, notably the ambient brightness 301, the flight altitude 302, its path in space 303 or else the position in space of the aircraft 304 (in particular in relation to the runway). This list is not exhaustive.

In more detail, in one embodiment, one visual surroundings parameter comprises one or more parameters from among the brightness level 301 (in the cockpit and/or measured through the head-up display device and/or in one or more directions in space in the field of vision), the altitude of the aircraft 302, the path of the aircraft 303 and the position of the aircraft 304, for example in relation to the runway.

The radio altitude 302 (which denotes the elevation of the aircraft in relation to the ground) is a parameter that it is advantageous to take into account as it indicates the risk of visual suppression associated with the lights of the approach ramp and/or of the runway. The values taken by the 'radio altitude' variable are generally between 200 and 600 feet. Between these two values, the lights of the approach ramp and/or of the runway will come into competition with the head-up display of the flight path vector. This is therefore an altitude interval that should warn of the risks of visual suppression.

In detail, the lights of the approach ramp belong to the PAPI (precision approach path indicator), which is an instrument that assists in making a correct approach to the runway. Most of the time, it is formed of four lights in a row. When the angle of approach is correct, there are two red lights and two white ones. When the aeroplane is too low, all of the lights appear red, and, when it is too high, they appear white. With regard to the lighting system of the runways, this is variable and may comprise a runway edge lighting system, a runway end lighting system, a runway threshold lighting system, a runway extension lighting system, a runway axis lighting system, a lighting system for the touchdown zones, the approach line, etc. All of these lights or beacons are therefore able to interfere at one time or another with the head-up display, in particular in the landing phase.

Another important parameter, considered on its own or in combination with the other parameters, which is not dependent on the flight context per se, is that of the ambient brightness. By measuring this brightness where appropriate, it is advantageous to adjust the luminance and/or chrominance contrast between the symbology that is displayed and the visual background.

Another parameter is the position of the aircraft in relation to the runway. This spatial position may make it possible to determine the risk of cognitive loss (e.g. calculations of the alignments of lights, ramps and other beacons with the head-up display). This position may be determined in various ways (by using one or more devices or methods from among GPS, image recognition, odometry, gyrometry, a compass, an accelerometer, a radar, a laser, a sonar, flight time, communication via an FMS system or a third-party system, e.g. ATC, etc.). Depending on the devices that are present and/or accessible, the position in space may be more or less accurate. For example, a flight management system may give the position of the runway, whereas a GPS receiver may give the position of the aeroplane, which will make it possible to evaluate the position (distance, orientation of the aircraft). Other instruments may make it possible to overcome the absence of certain devices. For example, in the absence of a GPS receiver, it is possible to use ILS (instrument landing system) deviations with a DME (acronym for distance-measuring equipment) distance indication. This information, if it is available, may be used in combination with the path of the aircraft.

Another parameter is the path of the aircraft. This information may be used to display the flight path vector FPV. This information, if it is known, makes it possible, with knowledge of the position of the runway, to determine, simulate, anticipate or measure (as the case may be) the likelihood (i.e. the risk) of the symbol of the flight path vector FPV being superimposed on an external visual element and disrupting the runway.

Depending on the (measured or estimated or simulated) visual surroundings conditions, display adjustments may be made. Generally, a plurality of visual adjustments are possible (the visual adjustments described hereinafter may be combined with one another).

In one embodiment, one (adjustment) parameter 320 for the display (of the head-up display device) comprises one or more parameters comprising the luminance 321, the chrominance 322 and/or the geometry 323 of the displayed element.

In one embodiment, the geometry 323 of the displayed element comprises or corresponds to location parameters 3231 and/or display dimension parameters 3232. Other form elements such as the texture and/or the display case/font 3233 may be manipulated.

In one embodiment, the symbols or elements that are displayed may in some cases be moved, radically or slightly. As a certain stability of human-machine interfaces is generally necessary (e.g. training, learning, reaction speed, etc.), the modifications to the display locations are generally limited (but not impossible, since a few alternative locations may exist).

In one embodiment, the visual adjustments may be geometric. A symbol displayed at its usual location may for example be enlarged or magnified. In other words, the symbol whose risk of disappearance is determined may be manipulated geometrically so as to avoid the perceptual elimination thereof.

In one embodiment, the visual adjustments may comprise one or more adjustments of the luminance and/or of the chrominance. This adjustment may change over time (more or less sudden or smooth, etc.), in various combinations. In particular, the visual adjustments may follow one or more predefined rules.

In one embodiment, the method furthermore comprises the step of detecting the emergence of visual suppression by psychovisual simulation. This may be achieved by way of a vision model. Detected a short time before the conscious appearance or a short time after appearance thereof, it may again be time to take countermeasures.

In one ('proactive') embodiment, visual suppressions may be anticipated. In other words, the conditions for the emergence of a cognitive loss may be monitored and corrected if the risk becomes too great, notably in the absence of visual suppression (before it has started). This is then risk management. In detail, pragmatic scenarios may be used (specifically, for example, the flight path vector FPV displayed in the right-hand monocular may be hidden by the right-hand lateral ramp of the runway if the aeroplane is landing).

In one ('reactive')) embodiment, a cognitive loss may be suspected (i.e. determined using a pre-existing human vision model) but possibly measured (ex post) 311. Sensors 3111 (e.g. for gaze tracking or eye tracking, for monitoring the blink rate of the eyes, for tracking the pupils, etc.) may then determine that a visual suppression phenomenon has started. A short time after the start of visual suppression, the adjustments described hereinafter may be implemented, so as to cancel out or compensate for or reverse the cognitive loss.

In one embodiment, the step of adjusting 320 one or more display parameters of the head-up display device may be governed or ruled or influenced by one or more display rules. A display rule may be predefined (for example configured by the airline) and/or be able to be configured (for example by the pilot of the aircraft).

In one embodiment, a display rule may depend on the flight context of the aircraft (e.g. flight phase, flight event, constraint or operational objective, etc.). The flight context at a given moment incorporates all of the actions taken by the pilots (and notably the effective piloting instructions) and the influence of the external environment on the aircraft. A 'flight context' comprises for example one situation from among predefined or pre-categorized situations associated with data such as the position, the flight phase, the waypoints, the current procedure (and others). For example, the aircraft may be in approach phase for landing, in take-off phase, in cruising phase but also in level ascending, level descending, etc. (a variety of situations may be predefined). Moreover, the current "flight context" may be associated with a multitude of attributes or of descriptive parameters (current weather state, state of the traffic, status of the pilot, comprising for example a stress level as measured by sensors, etc.). A flight context may therefore also comprise data, which are for example filtered by priority and/or based on flight phase data, weather problems, avionic parameters, ATC negotiations, anomalies linked to the status of the flight, problems linked to the traffic and/or to the topology. Examples of "flight context" comprise for example contexts such as "cruising phase/no turbulence/nominal pilot stress" or indeed "landing phase/turbulence/intense pilot stress". These contexts may be structured according to various models (e.g. hierarchized for example in a tree or according to various dependencies, including graphs). Context categories may be defined, so as to synthesize the needs in terms of human-machine interaction (e.g. minimum or maximum interaction period, minimum and maximum number of words, etc.). Specific rules may also exist in some contexts, notably emergencies or critical situations. The context categories may be static or dynamic (e.g. able to be configured). The method may be implemented in a system comprising means for determining a flight context of the aircraft, said determination means comprising in particular logic rules, which manipulate values as measured by physical measurement means. In other words, the means for determining the "flight context" comprise system means or "hardware" or physical/tangible means and/or logic means (e.g. logic rules that are for example predefined). For example, the physical means comprise the avionics instrumentation proper (radars, probes, etc.) that make it possible to establish factual measurements characterizing the flight. The logic rules represent all of the information processing operations that make it possible to interpret (e.g. contextualize) the factual measurements. Some values may correspond to several contexts and, by correlation and/or computation and/or simulation, it is possible to decide between candidate 'contexts' by way of these logic rules. A variety of technologies makes it possible to implement these logic rules (formal logic, fuzzy logic, intuitionist logic, etc.).

In one embodiment, the element that is displayed may be the flight path vector FPV of the aircraft. Implementing the invention is then particularly advantageous, especially as the landing phase is a critical phase of the flight.

In one embodiment, the display system comprises one or more brightness sensors measuring the brightness in the cockpit, in one or more directions in space of the visual surroundings and/or through the head-up display device.

In one embodiment, the display system comprises one or more gaze-tracking devices (for example 3111), said devices being able to determine or contribute to determining or anticipating a risk of visual suppression.

In one embodiment, the head-up display device is monocular. It may be binocular in some embodiments.

A description is given of a computer program product, this computer program comprising code instructions for carrying out one or more of the steps of the method when this program is executed on a computer.

In one embodiment, the data display system is implemented in the cockpit of an aircraft. This system may comprise a head-up display device, and this system may be configured to determine one or more visual surroundings parameters associated with the head-up display device;

determine a risk of visual suppression by binocular rivalry between an element of the visual surroundings and an element displayed by the head-up display device on the basis of said visual surroundings parameters;

on the basis of the determined risk, adjust one or more display parameters of the head-up display device.

In one embodiment, the display system may comprise one or more brightness sensors and/or one or more gaze-tracking devices.

Figure 4:
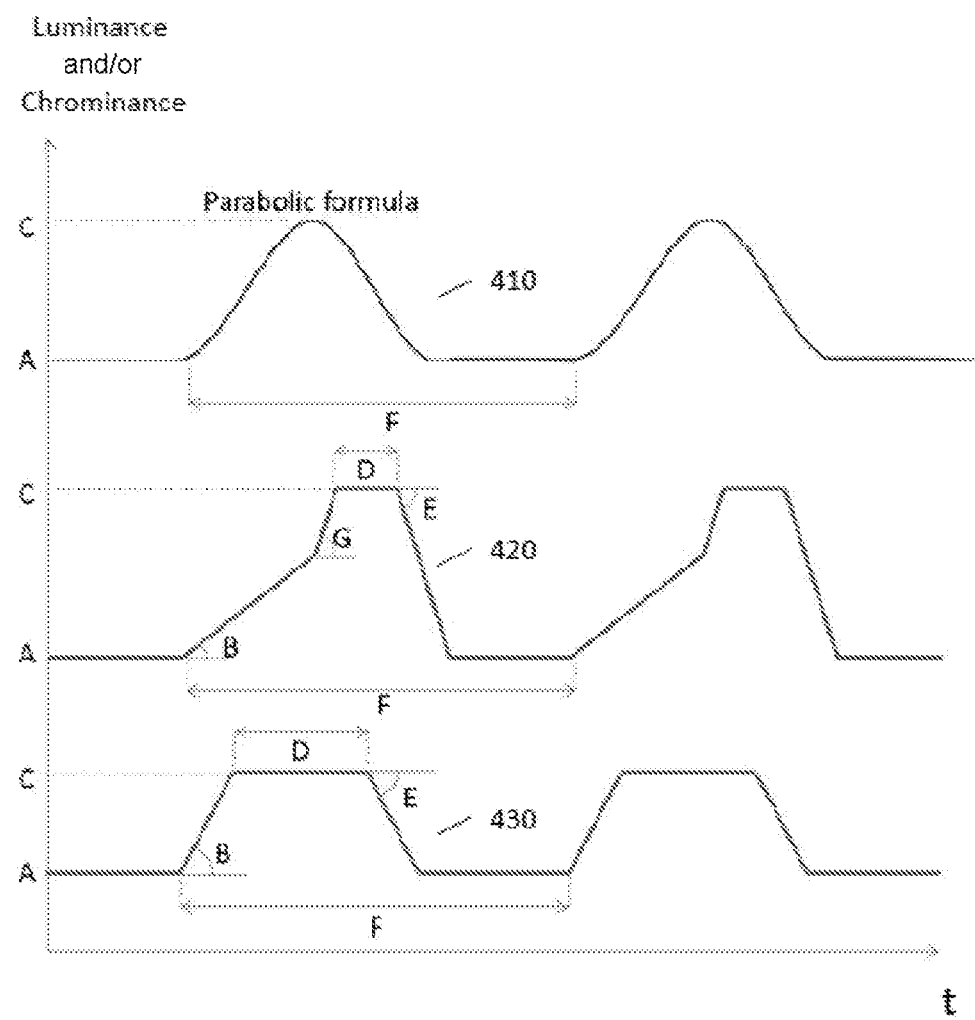
FIG. 4 illustrates specific examples of the adjustment of the display according to the invention.

FIG. 4 shows a few specific examples of the adjustment of the display, and in particular illustrates examples of profiles of variation of the luminance and/or of the chrominance.

The figure shows three profiles (410, 420, 430) illustrating the intensity of the form and/or background manipulations made on the displayed element likely to be the subject of visual suppression.

One manipulation may be that of modifying the luminance, as illustrated in FIG. 4.

The level indicated A) illustrates the lowest luminance level. The factor B) represents the rate of increase of the luminance (which may be regulated, from a gradual variation to a sudden variation). The level indicated C) represents the highest luminance level. The character D) indicates the duration of the high plateau phase. The factor E) represents the rate of reduction of the luminance, which may also be more or less gradual (with increments or intermediate rates illustrated by the character G)). The double-headed arrow F shows the duration of the complete cycle.

With regard to the (geometric) form manipulations, in one embodiment, the displayed element likely to be the subject of visual suppression may be displayed with thicker lines for a certain time interval F (for example 50 milliseconds) so as then to return to its normal outline. The featured examples may be combined with one another. Depending on the brightness, the graphical manipulations may be modulated. For example, the thickening of the lines of the displayed elements could be greater during the day than at night. In some cases, the reversal of the loss of a given symbol may be more likely at night than during the day.

In one embodiment, the method is implemented by computer.

By way of example of hardware architecture suitable for implementing the invention, a device may include a communication bus to which a central processing unit (CPU) or microprocessor are connected, which processor may be "multicore" or "manycore"; a read-only memory (ROM) able to contain the programs necessary for implementing the invention; a random access memory (RAM) or cache memory containing registers suitable for recording variables and parameters that are created and modified during the execution of the aforementioned programs; and an I/O ("input/output") or communication interface suitable for transmitting and for receiving data. In the case where the invention is implanted in a reprogrammable computing machine (for example an FPGA circuit), the corresponding program (that is to say the sequence of instructions) may be stored in or on a storage medium that is removable (for example an SD card, a mass storage means, such as a hard disk, e.g. an SSD) or that is non-removable, that is volatile or non-volatile, this storage medium being readable in part or in full by a computer or a processor. The reference to a computer program that, when it is executed, performs any one of the previously described functions is not limited to an application program being executed on a single host computer. On the contrary, the terms computer program and software are used here in a general sense to refer to any type of computer code (for example, application software, firmware, microcode, or any other form of computer instruction, such as web services or SOA or via programming interfaces API) that may be used to program one or more processors so as to implement aspects of the techniques described here. The computer means or resources may in particular be distributed ("cloud computing"), optionally with or according to peer-to-peer and/or virtualization technologies. The software code may be executed on any suitable processor (for example a microprocessor) or processor core or set of processors, whether these are provided in a single computing device or distributed between several computing devices (for example such as possibly accessible in the environment of the device). Security technologies (crypto-processors, possibly biometric authentication, encryption, chip card, etc.) may be used.

The invention claimed is:

1. A data display management method, implemented in a monocular or binocular display device, comprising the steps of:
   determining one or more visual surroundings parameters associated with the display device;
   determining a risk of visual suppression by binocular rivalry between an element of the visual surroundings and an element displayed by the display device on the basis of said visual surroundings parameters;
   on the basis of the determined risk, adjusting one or more display parameters of the display device, a display parameter of the display device comprising one or more of a luminance and a chrominance of one or more of a plurality of elements displayed by the display device, and the display parameter being modified over time according to profiles comprising a sequence of two or more of a gradually increasing, a constant plateau, a suddenly increasing, and a gradually decreasing.

2. The method according to claim 1, one visual surroundings parameter comprising one or more of an ambient brightness level and a brightness level measured through the display device.

3. The method according to claim 2, one surroundings parameter comprising one or more of an altitude of an aircraft in which the display device is situated, a path of said aircraft, and a position of said aircraft in relation to a runway.

4. The method according to claim 2, one surroundings parameter furthermore comprising parameters associated with an activity of a user using the display system.

5. The method according to claim 1, one display parameter furthermore comprising one or more of a geometry of the displayed element, said geometry comprising location, and display dimension parameters.

6. The method according to claim 1, furthermore comprising the step of indirectly determining an emergence or a presence of visual suppression by comparison between commands emitted by a user of the display system and instructions that are displayed.

7. The method according to claim 1, furthermore comprising the step of determining an emergence or a presence of visual suppression by activation of an actuator.

8. The method according to claim 1, furthermore comprising the step of warning of an emergence of visual suppression by a repeated display, variable over time or in space, of visual reminder elements.

9. The method according to claim 1, the step of adjusting one or more display parameters of the display device being governed by one or more display rules that are predefined or able to be configured by a user wearing the display device.

10. The method according to claim 1, a display rule depending on a flight context of the aircraft.

11. The method according to claim 1, one element that is displayed being a flight path vector FPV of an aircraft.

12. A computer program product, said computer program comprising code instructions for carrying out the steps of the method according to claim 1, when said program is executed on a computer.

13. A data display system, said system comprising a monocular or binocular display device, said system being configured to:
   determine one or more visual surroundings parameters associated with the display device;
   determine a risk of visual suppression by binocular rivalry between an element of the visual surroundings and an element displayed by the display device on the basis of said visual surroundings parameters;
   on the basis of the determined risk, adjust one or more display parameters of the display device, a display parameter of the display device comprising one or more of a luminance and a chrominance of one or of a plurality of elements displayed by the display device, the display parameter being modified over time according to profiles comprising a sequence of two or more of a gradually increasing, a constant plateau, a suddenly increasing, and a gradually decreasing.

14. The display system according to claim 13, comprising one or more brightness sensors measuring one or more of a ambient brightness and a brightness in one or more directions in space of the visual surroundings or through the display device.

15. The system according to claim 13, the display system comprising one or more gaze-tracking devices.

* * * * *